United States Patent [19]

Krohn

[11] Patent Number: 4,741,581
[45] Date of Patent: May 3, 1988

[54] DEVICE FOR ANTI-LOCK CONTROL AND FOR THRUST CONTROL ON A MOTOR VEHICLE WITH ALL-WHEEL DRIVE

[75] Inventor: Hellmut Krohn, Esslingen, Fed. Rep. of Germany

[73] Assignee: Daimler-Benz Aktiengesellschaft, Stuttgart, Del.X

[21] Appl. No.: 902,682

[22] Filed: Sep. 2, 1986

[30] Foreign Application Priority Data

Aug. 31, 1985 [DE] Fed. Rep. of Germany ....... 3531157

[51] Int. Cl.$^4$ .......................... B60T 8/42; B60T 13/68
[52] U.S. Cl. ................................... 303/115; 303/119; 180/197
[58] Field of Search ..................... 180/107; 188/181; 303/92, 102, 103, 105, 110, 111, 114–117, 119

[56] References Cited

U.S. PATENT DOCUMENTS

| 3,747,990 | 7/1973 | Tanguy | 303/92 |
| 4,121,872 | 10/1978 | Burgdorf | 303/115 |
| 4,175,794 | 11/1979 | Pauwels | 303/105 |

FOREIGN PATENT DOCUMENTS

| 3006137 | 8/1981 | Fed. Rep. of Germany. | |
| 3128788 | 4/1982 | Fed. Rep. of Germany | 303/113 |
| 3421776 | 12/1984 | Fed. Rep. of Germany | 180/197 |

Primary Examiner—Andres Kashnikow
Assistant Examiner—Timothy Newholm
Attorney, Agent, or Firm—Barnes & Thornburg

[57] ABSTRACT

In a motor vehicle with an all-wheel drive, which is equipped with a thrust and anti-lock control device, each wheel brake has assigned to it a pressure modulator, within which a control-pressure space, into which the outlet pressure of a brake unit can be fed, and an outlet-pressure space, to which a particular wheel brake is connected, are limited by a control piston. This control piston ensures the hydraulic separation of the control circuit from the outlet circuit. Two drive pistons supported on the control piston limit, within the modulator housing, two drive-pressure spaces which, by being connected alternately to the outlet of an operating-pressure source, can control pressure build-up and pressure-reduction control movements of the control piston. To control the connection of the drive-pressure spaces to this operating-pressure source, there are two-way solenoid valves which can be activated by means of output signals from an electronic control unit provided jointly for the anti-lock control and the thrust control.

13 Claims, 2 Drawing Sheets

4,741,581

DEVICE FOR ANTI-LOCK CONTROL AND FOR THRUST CONTROL ON A MOTOR VEHICLE WITH ALL-WHEEL DRIVE

BACKGROUND AND SUMMARY OF INVENTION

The invention relates to an arrangement for anti-lock control and for thrust control on a motor vehicle with all-wheel drive having a multiple-circuit fluid brake system controlled by a main cylinder with individual brakes for each of the wheels, with a main brake-fluid reservoir.

Devices of this type correspond to a level of in-house technical development attained by the application. However, German Published Unexamined Patent Application No. 3,006,137 shows a thrust-control device for vehicles with all-wheel drive, in which each driven vehicle wheel has assigned to it a pressure modulator which, by being connected under valve control to an operating-pressure source, can build up a brake system, in order thereby to prevent spinning of the vehicle wheels and keep their drive slip within a range of values linked to good thrust acceleration and to good driving stability.

The pressure modulators of the known thrust-control device have a drive piston which is designed as a differential piston and the larger piston step of which limits a drive-pressure space, into which the outlet pressure of the operating-pressure source can be fed. The differential piston also has a smaller piston step which limits an outlet-pressure space, from which projects the wheel-brake line leading to the wheel brake. As long as the thrust-control device is not activated, this outlet-pressure space is in communication, via a breather bore, with an outlet-pressure space of the brake unit, usually a tandem main cylinder. During normal braking, the outlet pressure generated in the tandem main cylinder as a result of pedal actuation is fed, via the outlet-pressure space of the modulator, into the wheel brake connected to the modulator. In this case, the outlet-pressure space of the pressure modulator acts as a line portion of the wheel-brake line.

When the thrust-control device is activated, so that the drive-pressure space of the pressure modulator is connected to the outlet of the operating-pressure source, then the differential piston of the pressure modulator is displaced in the direction of a pressure build-up in its outlet-pressure space. After the breather bore has been overrun, the modulator outlet-pressure space is shut off from the brake unit and the modulator itself acts as a brake unit which generates the brake pressure in a static hydraulic brake circuit.

A thrust-control device as described above can be combined perfectly well with an anti-lock device, it being expedient to insert between the pressure modulators and the wheel brakes connected to the brake-pressure regulating valves which can be controlled electrically by means of an electronic control device. These valves can be designed, for example, as three-way solenoid valves which can also be switched from a basic position, namely the pressure build-up position, into a pressure-holding position and a pressure-reduction position. In a design of the anti-lock device operating on the return principle, there would then have to be a return pump for each brake circuit of the brake system. Although the return pumps required for the individual brake circuits of a vehicle can have a common electrical drive, nevertheless such a combination of a thrust control and an anti-lock control would involve a very high outlay in technical terms, since electrically drivable pumps would have to be provided both for the anti-lock control device and the operating-pressure souce required for the thrust-control device.

In a further possible combination of the known thrust-control device with an anti-lock system operating on the bleed principle, although there would be no need for a return device, nevertheless, in this case, the brake system would have to be designed as a hydraulic auxiliary brake system. This system, even if the hydraulic auxiliary power source required for it were to be used for the thrust-control device, would involve a considerable technical outlay, since in addition to a brake valve of expensive design, it would also be necessary to provide measures to prevent "idle control" of the individual brake circuits. Further outlay would be necessary for this system, in order, in the event of a malfunction, for example a leak in one of the brake circuits, to make it possible to utilize the operating capacity of the brake circuit still intact.

How great this outlay is in technical terms can be inferred, for example, from German Published Unexamined Patent Application No. 3,421,776, which discloses a dual-circuit braking system for an all-wheel drive vehicle, which is equipped both with an anti-lock system operating in accordance with the release principle and also with a thrust control device.

It is also known (German Published Unexamined Patent Application No. 3,128,798) to construct an anti-lock system according to the principle of volume expansion and for this purpose to use, for example, pressure modulators which are individually associated with the wheel brakes capable of being subjected to control and which have a first control pressure base. A piston subjected to the output pressure of a tandem main cyclinder undergoes a displacement, by means of which braking pressure is built up statically in an outlet pressure space of the modulator. The wheel brake capable of being subjected to control is connected to this outlet pressure space as is a second control pressure space. The piston subjected - under valve control - to the outlet pressure of an auxiliary pressure force is again displaced back, against the pressure coupled into the first control pressure space, and thereby, by volume expansion of a outlet pressure space, braking pressure is diminished again in the associated wheel brake. This known arrangement, operating in accordance with the principle of volume expansion, for anti-lock control could indeed be combined with the initially described thrust control arrangement, likewise operating with pressure modulators, in such a manner that a respective pressure modulator for the thrust control and a pressure modulator for the anti-lock control are provided. However, such an arrangement would again be associated with a considerable outlay in technical terms.

An object of the invention is, therefore, to provide a device of the type mentioned in the introduction which can be produced at a markedly lower outlay in technical terms and which reliably meets the safety requirements placed on such a device.

According to the invention, this and other objects are achieved by means of an arrangement having a pressure modulator in at least one of the brake circuits for modulating fluid brake pressure applied to a corresponding brake to provide braking, anti-locking and thrust control of said brake. Connected to the pressure modulator is an operating-pressure supply means having a reservoir and a pressure outlet, for supplying and receving fluid to and from the pressure modulator. The arrangement also comprises valve means for controlling flow of the fluid between the presure modulator and the brake, and between the pressure modulator and the operating-pressure supply means. A valve control means controls the operation of the valve means.

A hydraulic separation is obtained by the pressure modulators of the brake-pressure control circuits assigned to the individual wheel brakes from the outlet circuits, to which the wheel brakes are connected. This has the advantage that each wheel has its own brake circuit, with the result that, in the event of a malfunction in one of these wheel-brake circuits, there is not reaction in the other wheel-brake circuits. If there is a failure of one of the wheel-brake circuits, very good braking deceleration can still be achieved by means of the further wheel-brake circuits which remain operational.

The separation of the wheel-brake circuits from the control unit also provides in an elegant way the precondition for ensuring that the brake-pressure control for the anti-lock control can take place according to the principle of an increase in volume, in other words, as a result of a retraction of the control piston of the particular pressure modulator. This in a simple way prevents "idle control" of the individual brake circuits and guarantees a high operating reliability of the brake system as a whole.

The design of the control piston and its arrangement in the pressure modulator, along with the drive pistons and the spring, allow an elegant control of the advancing and retracting movements of the modulator control pistons which are necessary for the anti-lock and the thrust control.

The advantage provided by designing the control piston with two piston flanges having an annular space space between them is that a leak in the region of the pressure modulator can be detected reliably from a "flopping" of the brake pedal, and consequently repair measures can be carried out in good time before a complete failure of the brake system can occur.

By designing the drive-pistons a differential pistons in contemplated embodiments, it is possible in a simple way to match the pressure modulators to the outlet-pressure level of an operating-pressure source which can be lower than the maximum utilizable brake pressure for which the brake system is designed. Then, for example, an auxilliary-pressure source, operating at a relatively low pressure level and present on the vehicle in any case, of a power steering system or levelling control can be used as an operating-pressure source.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
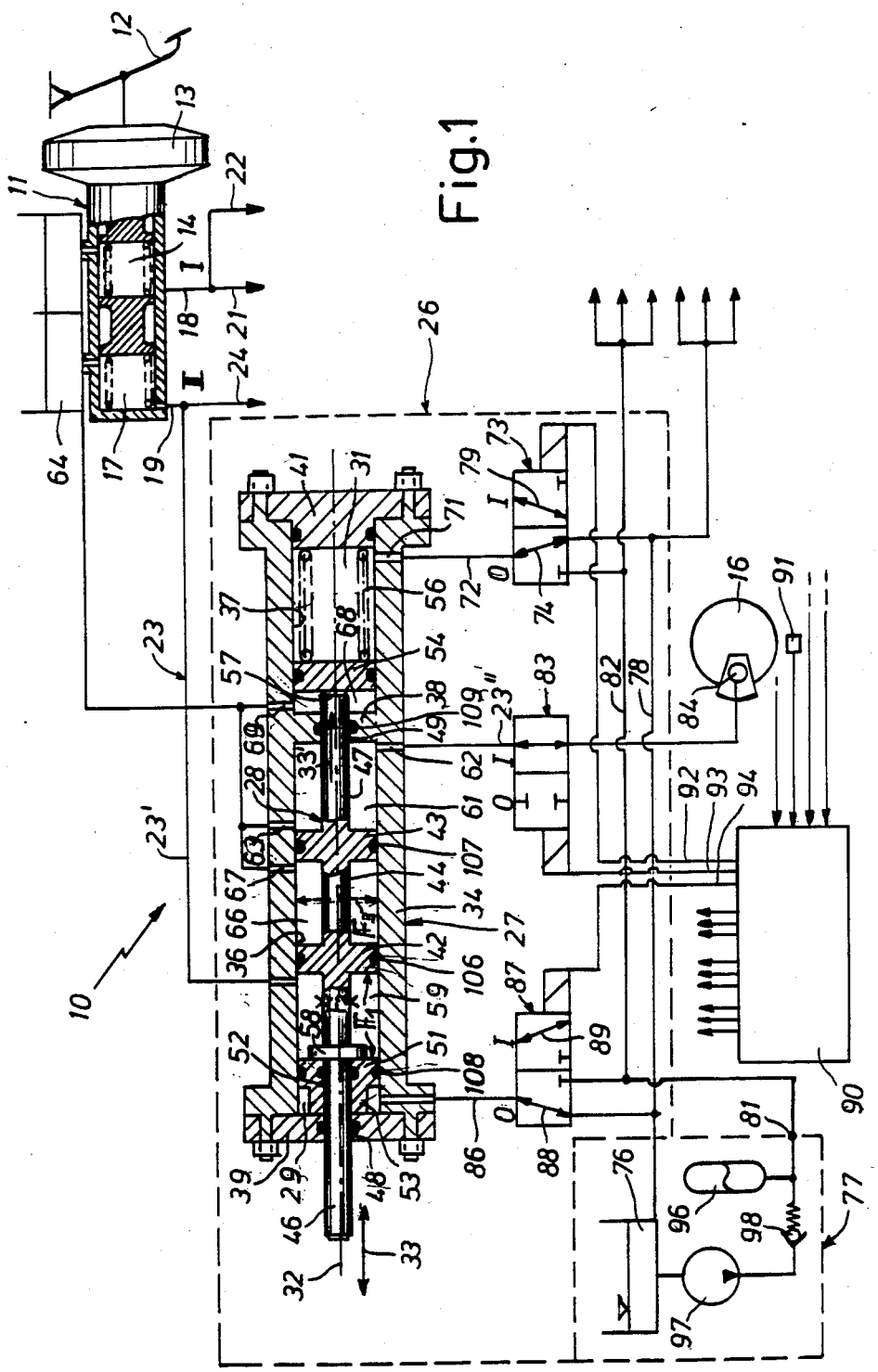
FIG. 1 is a partially schematic, partly cross-sectional view of a preferred embodiment of the present invention

FIG. 1 illustrates the basic design of the hydraulic brake system 10 of a motor vehicle which is equipped both with an anti-lock control device and with a thrust-control device combined in the manner according to the invention. It is assumed that the vehicle, represented only by the brake system 10 in the drawing, has an all-wheel drive. For purposes of description, the brake system 10 is assumed to be a dual-circuit brake system, in which the brake-pressure control unit is a tandem main cylinder 11 of conventional design which is actuated by means of a brake pedal 12 via a brake booster, for example a vacuum-type brake booster 13.

In the examplary embodiment illustrated, the division of the brake circuits is such that the front-wheel brakes (not shown) are combined in a common front-axle brake circuit, namely the brake circuit I, which is connected to the diagramatically indicated primary outlet-pressure space 14 of the tandem main cylinder 11. The rear-wheel brakes of the vehicle, of which FIG. 1 shows representatively a single wheel brake 16, are combined in the rear-axle brake circuit II which is connected to a secondary outlet-pressure space 17 of the tandem main cylinder 11.

Both the anti-lock control device and the thrust-control device are designed as so-called single-wheel control devices, by means of which the brake pressure can be regulated or controlled individually on each wheel brake for the particular control purpose.

To achieve this single-wheel control, there is in each of the wheel-brake circuit branches 21, 22 or 23, 24 leading to the individual wheel brakes 16 and starting from the main brake lines 18 and 19 of the front-axle and rear-axle brake circuits I and II, a brake-pressure modulation device which is designated as a whole by 26. By known control principles, this modulation device 26, in the control phases of the anti-lock control or thurst control brake pressure build-up, controls the brake-pressure holding and brake-pressure reduction operations on the individual wheel brakes 16 in the combination and time sequence corresponding to the particular control purpose.

Each of these pressure modulation devices 26 contains a pressure modulator designated as a whole by 27, which is designed as a double-acting hydraulic cylinder. The piston 28 of the cylinder, hereinafter referred to as the control piston, can be driven so as to be displaced in the alternative directions represented by the double arrow 33, along the central longitudinal axis 32 of the pressure modulator 27. The control piston 28 is driven as a result of pressure either exerted on or removed from a first drive-pressure space 29 and a second drive-pressure space 31.

The modulator housing 34 has two bores 36 and 37 which are aligned with one another and which are separated from one another by an intermediate wall 38 of the modulator housing 34. These two housing bores 36 and 37 are each closed off from the outside in a pressure-tight manner by housing covers 39 and 41.

The control piston 28, displaceable in the housing bore 36, has two piston flanges 42 and 43 arranged at an axial distance from one another. The flanges 42 and 43 are sealed off from this housing bore 36 and are connected to one another by a bar-shaped piece 44. The control piston 28 has extensions 46 and 47 resembling plungers, which pass through central bores 48 and 49 in the housing cover 39 and in the intermediate wall 38 of the modulator houing 34 respectively, and which are guided displaceably in these bores 48 and 49 and are sealed off from them. In the end portion of the housing bore 36, closed off directly by the housing cover 39, there is arranged displaceably in a pressure-tight manner a first drive piston 51 designed as an annular piston. The first drive piston 51 has a central bore 52 which is aligned with the bore 48 of the housing cover 39 and through which passes the plunger-like extension 46 of the control piston 28. This plunger-like extension 46 of the control piston 28 is also sealed off in the central bore 52 of the drive piston 51. The illustrated drive piston 51 has a short, sleeve-shaped extension 53 which points towards and is supported on the housing cover 39 in the illustrated basic position of the pistons 28 and 51 described thus far.

Arranged displaceably in a pressure-tight manner in the housing bore 37 extending from the intermediate wall 38 is a second drive piston 54. As a result of the prestress of a compression spring 56 supported at one end by the cover 41 closing off this bore 37 and at the other end by the second drive piston 54, the second drive piston 54 is held up against the end 57 of the plunger-like extension 47. This extension 47 projects into the bore 37 through the intermediate wall 38. The force of the spring 56 acting on the second drive piston 54 urges the control piston 28 into the basic position illustrated. The movement of the control piston 28 to the left in FIG. 1 is limited by the abutment of an annular stop flange 58 of the plunger-like extension 46 against the first drive piston 51 and the abutment of the piston 51 against the housing cover 39.

The piston flange 42 of the control piston 28, and the first drive piston 51 limit, in the axial direction within the first bore 36, a control-pressure space 59. This space 59 is connected, via the line portion of the wheel-brake circuit branch 23 extending between the pressure modulator 27 and the tandem main cylinder 11, to the main brake line 19 of the rear-axle brake circuit II starting from the secondary pressure space 17 of the tandem main cylinder. In each position of the control piston 28 and the drive piston 51, the control-pressure space 59 is in communication with the secondary outlet-pressure space 17 of the tandem main cylinder 11.

The other piston flange 43, of the control piston 28 and the intermediate wall 38 limit in the axial direction, an outlet-pressure space 61, having an outlet channel 62 connected with a line portion 23″ of the wheel-brake circuit branch 23 leading to the wheel brake 16. This outlet-pressure space 61 is connected to the brake-fluid reservoir 64 by a follow-on channel designed as a breather bore 63 in the exemplary embodiment illustrated. The communication between the outlet-pressure space 61 and the reservoir 64, which exists in the illustrated basic position of the control piston 28, is blocked after a short portion of the initial stroke of the control piston 28. After this blockage, as a result of further displacement of the control piston 28 in the direction of the arrow 33, pressure built up in the outlet-pressure space 61 can be fed into the wheel brake 16 as brake pressure.

An annular space 66, which is limited by the two piston flanges 41 and 43 of the control piston 28 and the axial extent of which is slightly greater than the maximum stroke of the control piston 28, is in constant communication with the brake-fluid reservoir through a connecting bore 67 in the modulator housing 34. Likewise, a follow-on space 68, limited fixedly by the intermediate wall 38 and movably by the second drive piston 34 arranged in the right-hand bore 37, is in constant communication with the brake-fluid reservoir 64 through a connecting bore 69 in the modulator housing 34.

In the exemplary embodiment illustrated, there opens into the second drive-pressure space 31, in the immediate vicinity of the housing cover 41 closing off this drive-pressure space 31 from the outside, a connecting bore 71 of the modulator housing 34. To this bore 71, a hydraulic control line 72 is connected which, in the basic position O of the first two-way solenoid valve 73, is connected by a first throughflow path 74 of this solenoid valve 73 to a flow-off or compensating line 78 leading to the tank 78 of a high-pressure source 77 which is used as an operating-pressure source of the thrust control.

The first two-way solenoid valve 73, designed as a three/two-way valve in preferred embodiments, assumes an energized position I when it is activated. In this position I, the control line 72 is connected, via a second throughflow path 79 alternative to the first throughflow path 74, to a delivery line 82 leading to the operating-pressure outlet 81 of the operating-pressure source 77.

In the basic position O of a second two-way solenoid valve 83 designed as a two/two-way valve, the line portion 23″, starting from the outlet 62 of the outlet-pressure space 61 of the pressure modulator 27, of the wheel-brake circuit branch 23 illustrated is in communication with the hydraulic actuating element 84, namely a wheel-brake cylinder or a pair of wheel-brake cylinders, which, as a result of pressure being exerted on it, activates the wheel brake 16. In the alternative energized position I of the two-way solenoid valve 83, the outlet-pressure space 61 of the pressure modulator 27 is shut off from the hydraulic actuating element 84 of the wheel brake 16. A further connecting bore 85 of the modulator housing 34, to which a hydraulic control line 86 is connected, opens into the first drive-pressure space 29 of the pressure modulator 27. The first drive-pressure space 29 is fixedly limited by the left-hand housing cover 39 and is movably limited by the drive piston 51. In the basic position O of the third two-way solenoid valve 87, in preferred embodiments designed as a three/two-way valve, the control line 86 is in communication with the reservoir 76 of the operating-pressure source 87.

The brake system 10 described so far works as follows in typical operating situations, the first situation to be considered being braking without anti-lock control.

In this situation, the three two-way solenoid valves 73, 83 and 87 each assume their basic positions O, that is to say, these solenoid valves are not activated. When the brake pedal 12 is actuated, the pressure built up in the primary outlet-pressure space 17 of the tandem main cylinder 11 are then fed into the control-pressure spaces 59 of the pressure modulators 27 provided in the wheel-brake circuit branches 21, 22, 23 and 24. the control pistons 28 of the pressure modulator 27 are thereby displaced to the right according to FIG. 1. In this direction, there is a pressure build-up in the outlet-pressure spaces 61, with the result that brake pressure is built up uniformly in all the wheel brakes 16 of the brake system 10 through valve 83. At the same time, the pressure modulators 27 ensure a one-to-one conversion of the outlet pressure of the tandem main cylinder into the brake pressures effective on the wheel brakes 16 of the front-axle brake circuit I and rear-axle brake circuit II.

In a "normal" braking operation of this type, the first drive piston 51 remains up against the housing cover 39 on the left according to FIG. 1, in its basic position. Only the control piston 28 is displaced to the right in the direction of the arrow 33 according to FIG. 1, with the result that the pressure which can be fed into the connected wheel brake 16 via the line portion 23'' leading to and through the second solenoid valve 83 is built up in the outlet-pressure space 61. Together with the control piston 28, the second drive piston 54 is also displaced and thereby forces pressure medium out of the second drive-pressure space 31, and this flows off to the reservoir 76 of the operating-pressure source 77 via the throughflow path 74, open in the basic position of the first two-way solenoid valve 73, and through the compensating line 78.

When braking ends, the second drive piston 54 and, together with this, the control piston 28, are pushed back into the illustrated basic position by the compression spring 56. At the same time, brake fluid flows out of the control-pressure space 59 back to the connected outlet-pressure space 17 or 14 of the tandem main cylinder 11. Furthermore, brake fluid is forced out of the follow-on space 68 into the brake-fluid reservoir 64 of the tandem main cylinder 11. Brake fluid which flows out of the wheel brake 16, via the second two-way solenoid valve 83 open in the basic position O, back into the outlet-pressure space 61, is heated considerably during braking. As soon as the piston flange 53 of the control piston 28 has exposed the breather bore 63, the heated brake fluid expands completely towards the reservoir 64, and/or brake fluid can flow out of this again into the outlet-pressure space 61. During the time when the second drive piston 54 moves in the direction of its basic position, some brake-fluid subsequently flows from the reservoir 76 of the operating-pressure source 77 into the second drive-pressure space 31 through the compensating line 78 and via the first throughflow path of the first two-way solenoid valve 73 which is open in the basic position O of the latter.

A braking situation which is initiated as explained above and during which the anti-lock control drive is activated is considered next. It is assumed, in this case, that an anti-lock control cycle comprises several brake-pressure reduction and brake-pressure holding phases which take place in an alternating sequence, and where the initiating phases and the final phases of an anti-lock control cycle can be either pressure-reducing or pressure-holding phases. It is also contemplated to fit in between any two such anti-lock control phases, pressure build-up phases, during which the brake system 10 operates in the way explained above for normal braking. To explain the function of the anti-lock control device, it is therefore sufficient to describe its pressure-holding and pressure-reducing functions and the functional elements provided for these functions.

To control the anti-lock control functions, only the first and second two-way solenoid valves 73 and 83 are used. To perform the pressure-reducing function, the first two-way solenoid valve 73 is switched into its energized position I. In this position I, the second drive-pressure space 31 is connected to the operating-pressure outlet 81 of the operating-pressure source 77 via the second throughflow path 79 of this two-way solenoid valve 73 and via the delivery line 82, while the second two-way solenoid valve 83 remains held in its basic position O. Because the second drive-pressure space 31 or the drive piston 54 movably limiting the same is subjected to the (high) outlet pressure of the operating-pressure source 77, the control piston 28 is pushed back, counter to the control pressure fed into the control-pressure space 59 from the tandem main cylinder 11. Thus, the control piston 28 is moved in the direction of a pressure reduction in the outlet-pressure space 61. Consequently, the volume of the outlet-pressure space 61 increases, and brake fluid can therefore flow into the latter from the wheel brake 16, as a result of which the brake pressure is reduced. Thus, a control of the brake-pressure reduction, working on the principle of an increase in volume of the outlet-pressure space 61 of the pressure modulator 27, is obtained for the anti-lock control.

To achieve a pressure-holding phase of the anti-lock control, the second two-way solenoid valve 83 is switched into its energized position I (the blocking position), while the first two-way solenoid valve 73 remains held in its basic position. Pressure-reducing and pressure-holding phases of the anti-lock control can thus be obtained in a simple way as a result of the alternate activation of the two two-way solenoid valves 73 and 83 used for the anti-lock control.

The thrust control works on the principle that a vehicle wheel tending to spin is decelerated by activating its wheel brake, until the drive slip remains within a range of values compatible both with good thrust acceleration and with good driving stability. To achieve this control, the third two-way solenoid valve 87 and the second two-way solenoid valve 83 are used, with valve 87 controlling brake-pressure build-up phases and valve 83 controlling pressure-holding phases. These phases can take place alternately in a controlled cycle of the thrust control.

A brake-pressure build-up independent of the actuation of the brake pedal 12 and occurring in the wheel brake 16 of a particular vehicle wheel tending to spin is obtained by switching the third two-way solenoid valve 87 into its energized position I. In this position of the valve 87 the first drive-pressure space 29 is connected to the operating-pressure outlet 81, while the other two two-way solenoid valves 73 and 83 remain held in their basic positions O. Fluid pressure is now exerted in the first drive-pressure space 29 on the annular drive piston 51 supported on the stop ring 58 of the control piston 28 which is displaced in the direction of a pressure-build-up in the outlet-pressure space 61. As a result, the wheel brake connected via the second two-way solenoid valve 83 is activated and consequently the vehicle wheel tending to spin is decelerated.

A pressure-holding phase required during the thrust control is obtained by switching, in addition to the third two-way solenoid valve 87 already activated to achieve a pressure build-up, the second two-way solenoid valve 83 into its energized position I (the blocking position), in which the wheel brake 16 is shut off from the outlet-pressure space 61. In the pressure-holding phase of the thrust control, it is necessary to energize both two-way solenoid valves 87 and 83 simultaneously, since, if the two-way solenoid valve 87 connecting the first drive-pressure space 29 to the pressure outlet 81 were to fall back into its basic position O, the control piston 28 could be pushed back into its basic position by the compression spring 56. This would lead to the undesirable formation of bubbles in the outlet-pressure space 61.

A concluding pressure-reducing phase of the thrust control is achieved simply by deactivating the two-way solenoid valves 83 and 87. The control piston 28 is pushed back into its basic position as a result of the effect of the restoring spring 56. Such a pressure-reducing phase can be accelerated by briefly switching the first two-way solenoid valve 73 into its energized position I, the result of this being that the high outlet pressure of the operating-pressure source 77 is utilized to push back the control piston 28 in the direction of a pressure reduction in the wheel brake 16 subjected to the control.

As a result of the last-mentioned method of controlling pressure-reducing phases of the thrust control, the inertia of the latter can be reduced considerably, thus resulting in an increase in the utilizable thrust acceleration.

After an initiating pressure build-up phase, the pressure-holding, pressure-reducing and pressure build-up phases can take place successively in any required sequence in control cycles of the thrust control.

The activating signals required for controlling the above-described control phases of the anti-lock and thrust controls and intended for the two-way solenoid valves 73, 83 and 87 are generated in an appropriate sequence and combination by an electronic control unit 90, of known design, which is provided jointly for the anti-lock control and the thrust control. The control unit 90 detects the acceleration and deceleration behavior of the vehicle wheels from a processing, carried ot according to known criteria, of output signals proportional to the wheel speed from wheel-speed sensors 91 assigned individually to the vehicle wheels and transmits to control outputs 92, 93 and 94 assigned to any one of the pressure modulation devices 26 of the brake system 10 the electrical control signals by means of which any one of the two-way solenoid valves 73, 83 and 87 can be switched into their energized positions I.

On a vehicle with all-wheel drive, for example four-wheel drive, which is accordingly equipped with four pressure modulation devices 26, only a single operating-pressure source 77 is required. In the especially preferred embodiment illustrated, this incorporates a pressure accumulator 96 which can be charged from the reservoir 76 by means of a hydraulic pump 97 via a non-return valve 98 and which is maintained at a minimum level of accumulator pressure by means of a charging-control device (not shown).

In the exemplary embodiment illustrated in FIG. 1, the piston flanges 42 and 43 of the control piston 28 and the first drive piston 51 limiting the first drive-pressure space 29 used for the thrust control has the same effective annular piston areas $F_1$ which is smaller than the cross-sectional areas $F_3$ of the two housing bores 36 and 37 by the amount $F_2$ of the cross-sectional areas, assumed to be the same, of the plunger-like extensions 46 and 47 and of the bar-shaped intermediate piece 44. The effective working area of the second drive piston 54 which is subjected to the outlet pressure of the operating-pressure source 77 in a pressure-reducing phase of the anti-lock control, corresponds to the cross-sectional area $F_3$ of the housing bore 37.

If $P_m$ denotes the maximum control pressure which can be exerted by actuating the pedal with the greatest possible pedal force, then, so that a pressure-reducing phase of the anti-lock control is possible in this case, the relation $P_s \geq (F_2/F_3)P_m$ must always apply to the outlet pressure $P_s$ of the pressure accumulator 96. In practice, therefore, the operating-pressure source 77 must be designed for an outlet pressure which corresponds approximately to the maximum brake pressure of around 200 bars which can be generated as a result of the actuation of the tandem main cylinder 11. The technical outlay required for the operating-pressure level corresponds approximately to that which, in an anti-lock system working on the return principle, is involved for the return pump device conventionally buffered by means of an accumulator.

Figure 2:
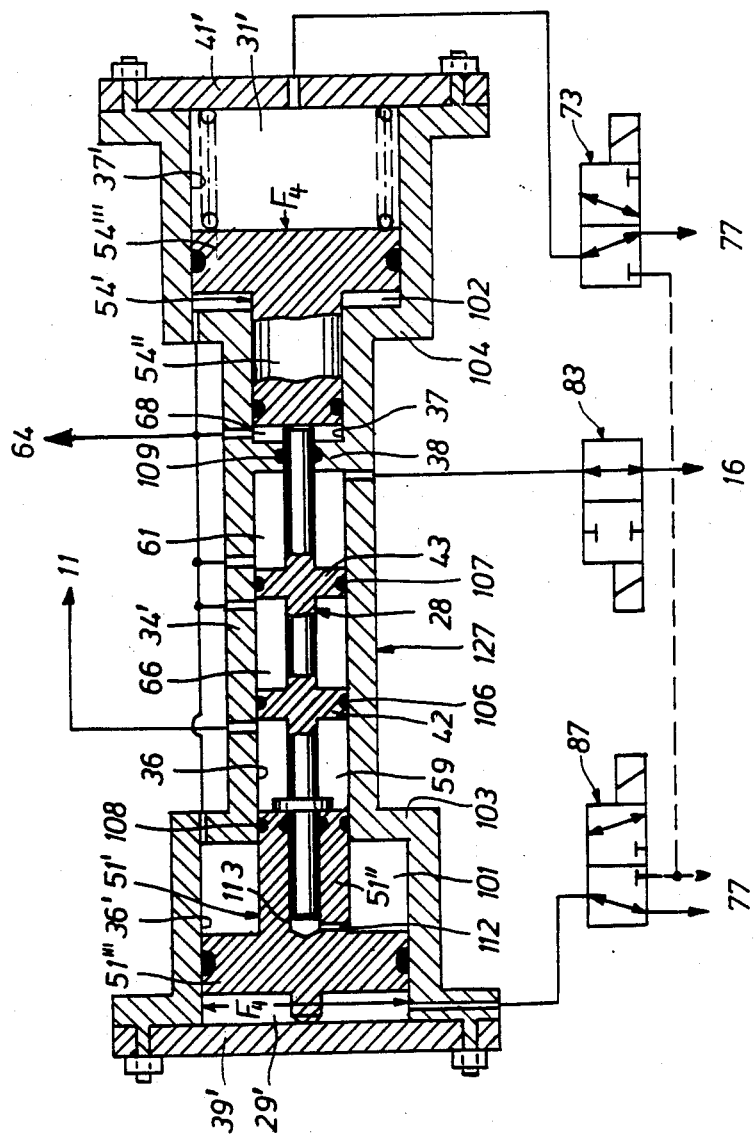
FIG. 2 is a cross-sectional view of an alternate preferred embodiment of the pressure modulator which can be used in the brake system shown in FIG. 1.

FIG. 2, to the details of which reference will now be made, illustrates a further preferred embodiment of a pressure modulator designated as a whole by 127, which corresponds substantially in terms of construction and functioning to the pressure modulator 27 according to FIG. 1 and which can be used in pressure modulation devices 26 of the brake system 19 in the same way as described with reference to FIG. 1 for the pressure modulator 27 shown in FIG. 1. Constructionally and functionally identical or similar elements of the pressure modulators 127 and 27 according to FIGS. 2 and 1 are designated by the same reference symbols in each of these figures, and to avoid repetition, where the elements identical in both figures are concerned, attention is drawn to the description of these elements which is given in relation to FIG. 1.

The pressure modulator 127 according to FIG. 2 differs in constructional terms from the pressure modulator 27 according to FIG. 1 in that the drive pistons 51' and 54', corresponding in functional terms to the first drive piston 51 and to the second drive piston 54 of the pressure modulator shown in FIG. 1, are designed as differential pistons which are respectively guided displaceably in a pressure-tight manner. The pistons 51 and 54 are guided by means of their smaller piston steps 51'' and 54'', in the housing bores 36 and 37, and their piston steps 51''' and 54''' of larger diameter in bore steps 36' and 37' of larger diameter. The bore steps 36' and 37' are arranged as extensions of the respective housing bores 36 and 37 and located in the modulator housing, designated as a whole by 34'. The respective larger steps 51''' and 54''' of the two drive pistons 51' and 54' and housing covers 39' and 41' closing off the widened bore steps 36' and 37' limit respectively in the axial direction the drive-pressure spaces 29' and 31' of the pressure modulator 127 which corresponds in functional terms to the drive-pressure spaces 29 and 31 of the pressure modulator 27 according to FIG. 1.

Annular compensating spaces 101 and 102, which are limited by the drive pistons 51' and 54' within the bore steps 36' and 37' and extend, as seen in the axial direction, respectively between the larger piston steps 51''' and 54''' of the drive pistons 51' and 54' and the radial annular portions 103 and 104 of the housing 34'. By these portions 103, 104, the walls of the widened bore steps 36' and 37' adjoin the central part of the housing 34', in the bores 36 and 37 of which the first drive piston 51', by means of its smaller piston steps 51'', and the control piston 28, on the one hand, and the smaller bore steps 54'' of the second drive piston 54', on the other hand, are guided displaceably in a pressure-tight manner. The annual compensating spaces 101, 102 are appropriately connected, together with the annular space 66 extending between the piston flanges 42 and 43 of the control piston 28, to the brake-fluid reservoir 64 of the brake system 10. The control-pressure space 59, the outlet-pressure space 61 and the follow-on space 68 of the pressure modulator 127 are connected in the same way to the tandem main cylinder 11 or the particular wheel brake 16 or the brake-fluid reservoir 64 of the brake-system 10 as explained with reference to FIG. 1. The same applies accordingly to the hydraulic connection of the drive-pressure spaces 29′ and 31′ to the two-way solenoid valves 87 and 33, the hydraulic connection of the two-way solenoid valves 73, 83 and 87 to the operating-pressure source, not shown here, and also the electrical connection of the two-way solenoid valves 73, 83 and 87 to the electronic control unit 90 of the combined anti-lock and thrust control system.

Since, in the pressure modulator 127, the areas $F_4$, over which the drive pistons 51′ and 54′ can be subjected to the outlet pressure of the operating-pressure source, are clearly larger than the areas of the control piston flanges 42 and 43 or of the smaller pistons step 51″ of the first drive piston 51′ which can be subjected to a pressure corresponding to the brake pressure, it is possible to use an operating-pressure source having an outlet pressure which is lower by the factor $F_2/F_4$ in comparison with the embodiment of FIG. 1.

In brake systems 10 with pressure modulators 27 or 127, the control pistons 28 act as isolating pistons which hydraulically isolate the inlet or control circuits, that is to say the control-pressure spaces 59, from the outlet-pressure spaces 61 of the pressure modulators 27 or 127. This effects a one-to-one conversion of the pressures fed into the control-pressures spaces 59 and generated by means of the brake unit 11 into the particular brake pressures fed into the wheel brakes 16. In the event of a defect in one of the outlet circuits of the pressure modulators 27 and 127, for example a leak in one of the brake line portions 23 leading further to the wheel brakes 16, or in the event of a malfunction of the second solenoid valve 83, for example if this is jammed in its locking position I, the remaining wheel brakes 16 remain operational and can also continue to be subjected to anti-lock and thrust control. A leak in one of the wheel-brake circuit branches can be detected from the lengthening of the brake-pedal travel associated with it. A malfunction of the solenoid valve 83 and of the other two two-way solenoid valves 73 and 87 can be ascertained by means of an electronic safety circuit which it is customary to provide and which is conventional in the electronic unit 90.

A malfunction of the pressure modulators 27 and 127 caused, for example, by damage to one of the gaskets 106 or 107, by means of which the piston flanges 42 and 43 of the control piston are sealed off from the housing bore 36, or by damage to the gaskets 108 and 109, by means of which the first drive piston 51 or 51′ is sealed off from the housing bore 36, in which the control piston 28 is guided displaceably and by means of which the control piston is sealed off from the intermediate wall 38 of the modulator housing 34 or 34′, can likewise be detected from a slackness of the brake pedal 12. The same applies when the gasket 111, by means of which the control piston 28 is sealed off from the central bore of the first drive piston 51 or 51′, is defective. So that this damage situation mentioned can be detected reliably, in the exemplary embodiment according to FIG. 2, the first drive piston 51′ of the pressure modulator 127 is provided with an oil-leak bore 112 which puts the central bore 113 of the drive piston 51′ in communication with the compensating space 101 of the modulator housing 34′.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Device for anti-lock control and for thrust control on a motor vehicle with all-wheel drive, with a multiple-circuit brake system which can be controlled by means of a main cylinder, and in which the brake pressures proportional to the pedal force, which can be fed into the wheel brakes, are provided in outlet-pressure spaces by pressure modulators which are assigned individually to the wheel brakes and which have a control piston, movably limiting the outlet-pressure space, and a drive piston acting on the control piston and, on one side, limiting a drive-pressure space which, for the purpose of thrust control, is either connected to a high-pressure outlet or to a resevoir of an operating-pressure source of the thrust-control device by means of a control valve controlled by output signals from an electronic control unit provided for the thrust and anti-lock control, and with brake-pressure regulating valve arrangements of an anti-lock control device, which are assigned to the individual wheel brakes and which, by means of output signals from the electronic control unit, can be switched from a basic position effecting the build-up of brake pressure into pressure-holding and pressure-reduction positions, the electronic control unit generating its output signals from the processing of speed-proportional signals of wheel-spaced sensors assigned individually to the vehicle wheels, said device comprising: said control piston for delimiting the outlet-pressure space of the pressure modulators from a control-pressure space and building up the brake pressure statically; a first drive-pressure space for the thrust control; a second drive-pressure space for the anti-lock control which is connectable as an alternative to said first drive-pressure space to the pressure outlet or the reservoir of the operating-pressure source for causing the control piston to effect an increase in the volume of the outlet-pressure space as a result of pressure on said second drive-pressure space; wherein the brake-pressure regulating valve arrangement contains a solenoid valve having a basic position in which it connects the outlet-pressure space to the connected wheel brake, and an energized position in which it prevents this connection, and a second solenoid valve, having a basic position in which the second drive-pressure space is connected to reservoir of the operating-pressure source, and an energized position in which the second drive-pressure space is connected to the operating-pressure source; wherein the outlet-pressure space of the pressure modulator has a fixed housing limitation formed by an intermediate wall of the modulator housing, this intermediate wall being provided with a central bore, through which passes a plunger which projects from the control piston and on which is supported a drive piston displaceable in the second drive-presure space and held up against the piston plunger by means of a prestressed compression spring.

2. Device according to claim 1, wherein a follow-on space limited by said drive piston within the modulator housing is in constant communication with the brake-fluid reservoir.

3. Device according to claim 2, wherein the control piston has a further piston plunger which extends through the control pressure space and the first drive-pressure space for the pressure build-up displacement and which passes through an end wall, forming a fixed housing limitation for the first drive-pressure space and is sealed off from this end wall, and in that the drive piston movably limiting this drive-pressure space is designed as an annular piston which is sealed off from the modulator housing and from the plunger and on which the control piston can be supported axially by means of an annular stop flange, and the annular piston can support itself by means of a sleeve-shaped portion, the outside diameter of which is less than the piston-flange diameter, on a second end wall of the modulator housing.

4. Device according to claim 3, wherein the control piston has two piston flanges which are arranged at an axial distance from one another and are connected firmly to one another by means of a central bar portion and of which one movably limits the control-pressure space and the other the outlet pressure space, with an annular space that is limited axially by the two piston flanges being connected to the brake-fluid reservoir.

5. Device according to claim 4, wherein at least one piston limiting the movable limitation of the drive-pressure space used for the thrust control is designed as a differential piston, with a larger piston surface that limits the drive-pressure space.

6. Device according to claim 5, wherein the two drive pistons limiting the drive-pressure spaces of the pressure modulator are designed as differential pistons, having larger piston steps which form the movable limitations of the drive-pressure spaces on one side.

7. Arrangement for anti-lock and thrust control of a motor vehicle with all-wheel drive having a multiple-circuit fluid brake system controlled by a main cylinder with individual brakes for each of the wheels, with a main brake-fluid reservoir, said arrangement comprising:

pressure modulator means in at least one of the brake circuits for modulating fluid braking pressure applied to a corresponding brake to provide braking, anti-locking and thrust control of said brake;

said modulator means having a control piston slidably displaceable in said pressure modulator means, such that displacement of the control piston in a first direction increases the pressure applied to said brake, while displacement of the control piston in a second direction opposite to said first direction decreases the pressure applied to said brake; and control means connected to said pressure modulator means for causing said control piston to be displaced in said first direction during both said braking and said thrust control of said brake, and to be displaced in said second direction during said anti-locking control;

wherein said control means include a single operating-pressure supply means connected to said pressure modulator means having a reservoir and a pressure outlet, for supplying and receiving fluid pressure to and from said pressure modulator means;

wherein said control means includes valve means for controlling flow of fluid between said pressure modulator means and said brake, and between said pressure modulator means and said operating-pressure supply means;

wherein said control means includes valve control means for controlling operation of said valve means;

wherein said pressure modulator means includes a first drive piston, with a space between said first drive piston and said control piston defining a control-pressure space which is connected to said main cylinder;

wherein said control piston is displaced in said first direction in response to an increase in pressure in said control-pressure space;

wherein said drive-piston movably limits a first drive-pressure space which is selectively connected by said valve means to said operating-pressure supply means during said thrust control such that an increase in fluid pressure in said first drive-pressure space causes said drive piston to cause said control piston to be displaced in said first direction to increase braking pressure;

wherein the pressure modulator means include a second drive-pressure space fluidly connected to the outlet-pressure supply means during said anti-locking control such that an increase in fluid pressure in said second drive-pressure space causes said control piston to be displaced;

wherein the valve means includes a first three/two-way solenoid valve and which selectively assumes a basic position which connects said second drive-pressure space to said reservoir, and an energized position which connects said second drive-pressure space to said pressure outlet;

wherein the valve means includes a second two/two-way solenoid valve means which selectively assumes a basic position which connects said outlet pressure space to said brake and an energized position which prevents this connection;

wherein said pressure modulator means includes an intermediate wall which fixedly limits the outlet-pressure space, said wall having a central bore through which a plunger of said control piston is slidably disposed;

further comprising a second drive piston displaceable in said second drive-pressure space and abutting an end of said plunger, and a spring means for biasing said second drive-piston against said plunger in said second direction.

8. Arrangement according to claim 7, wherein said drive piston movably limits, and said intermediate wall fixedly limits, a follow-on space which is fluidly connected to said main brake-fluid reservoir.

9. Arrangement according to claim 8, wherein said control piston includes a second plunger which extends through said first drive-pressure space and said control pressure space and through an end wall of said pressure modulator means, said end wall fixedly limiting the first drive-pressure space.

10. Arrangement according to claim 9, wherein said first drive piston is an annular piston having a sleeve-shaped portion with an outside diameter less than an outside diameter of a flange of said first drive piston.

11. Arrangement according to claim 10, wherein said second plunger axially supports said first drive piston and an annular stop flange.

12. Arrangement according to claim 11, wherein said control piston includes two piston flanges connected to one another by a central bar portion, forming an annular space between said flanges, one of said piston flanges movably limiting said control-pressure space, with said annular space connected to said main brake-fluid reservoir.

13. Arrangement according to claim 12, wherein said first drive piston is a differential piston having relatively larger and smaller piston faces, with said larger piston face movably limiting said first drive-pressure space.

* * * * *